Sept. 21, 1965  K. V. KING ETAL  3,207,968
ELECTRIC MOTOR CONTROL SYSTEM
Filed Sept. 11, 1961  2 Sheets-Sheet 1

INVENTOR.S
Kahl V. King
Ralph K. Shewmon
BY C. R. Meland
Their Attorney

Sept. 21, 1965 K. V. KING ETAL 3,207,968
ELECTRIC MOTOR CONTROL SYSTEM
Filed Sept. 11, 1961 2 Sheets-Sheet 2

INVENTORS
Kahl V. King
BY Ralph K. Shewmon
C. R. Meland
Their Attorney

United States Patent Office 3,207,968
Patented Sept. 21, 1965

3,207,968
ELECTRIC MOTOR CONTROL SYSTEM
Kahl V. King, Dayton, and Ralph K. Shewmon, Centerville, Ohio, assignors to General Motors Corporation, Detroit, Mich., a corporation of Delaware
Filed Sept. 11, 1961, Ser. No. 137,088
4 Claims. (Cl. 318—223)

This invention relates to electric motors and more particularly to an induction motor that is connected to provide multi-speed operation.

It is common practice in the induction motor art to provide a motor that has two stator windings one of which may be termed a main winding and the other a tap winding. In certain conventional shaded pole motors, these windings are wound one upon the other on the stator so that there is no angular displacement between the windings. There are three leads brought out, one of which is common to both windings and the other two being connected with the ends of the respective windings. These leads are connected with suitable switching means which connect the windings in series and across a power source for low speed operation and connect the common wire and one of the other leads across the power source for high speed operation.

When motors of this type are used in high humidity conditions, such as on air conditioners or dehumidifiers, they sometimes fail by shorting of one of the windings to ground or by a short between the windings. These failures can be attributed to a great extent to high voltage conditions between the windings and between the tap winding and ground.

It accordingly is an object of this invention to provide a multi-speed motor which has at least two windings and wherein the voltage appearing between the windings or between one of the windings and ground is greatly reduced as compared to heretofore known multi-speed systems.

A more specific object of this invention is to provide a multi-speed motor having at least two windings wherein the windings are connected in series for low speed operation and wherein one of the windings is connected across the source of power and the other winding is completely isolated from the source of power and from the one winding during high speed operation.

Further objects and advantages of the present invention will be apparent from the following description, reference being had to the accompanying drawings wherein preferred embodiments of the present invention are clearly shown.

Figure 1:
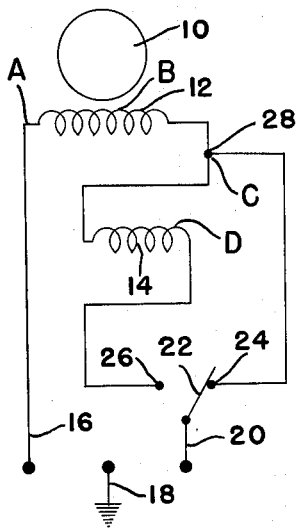
FIGURE 1 is a schematic circuit diagram of an induction motor connected to provide high speed operation.

Referring now to the drawings and more particularly to FIGURE 1, a conventional singe phase shaded pole induction motor is illustrated. This motor has a rotor 10 and a stator which has a main winding 12 and a tap winding 14. It is seen that one side of the main winding 12 is connected with lead wire 16 which is one of the power input leads of a three wire system. This three wire system in addition to lead wire 16 includes a neutral wire 18 and another lead wire 20. In a 230 volt three wire system, there will be 230 volts appearing between lead wires 16 and 20 whereas there will be 115 volts appearing between either lead wires 16 and 20 and the neutral wire 18.

In FIGURE 1, the connection of the main winding 12 and the tap winding 14 with the power input leads is controlled by a switch that includes a shiftable contactor 22. The shiftable contactor 22 is shown in FIGURE 1 in engagement with the fixed contact 24 but it can be shifted to engage the fixed contact 26. It is seen that the fixed contact 24 is connected with a junction 28 that joins the main winding 12 and the tap winding 14. The tap winding 14 is connected with fixed contact 26 as is clearly apparent from FIGURE 1.

It can be seen that with the switch contactor in the position illustrated in FIGURE 1, the main winding 12 is connected directly across lead wires 16 and 20. This will provide high speed operation for the shaded pole motor.

Figure 3:
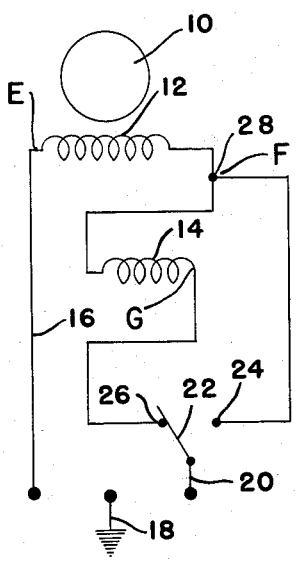
FIGURE 3 is a view similar to FIGURE 1 but illustrates the motor connected for low speed operation.

FIGURE 3 which is identical with FIGURE 1 shows the contactor 22 in engagement with the fixed contact 26. With the contactor 22 in the position of FIGURE 3, it is seen that the main winding 12 and the tap winding 14 are connected in series and across the power input leads 16 and 20. This provides low speed operation for the motor.

Figure 2:
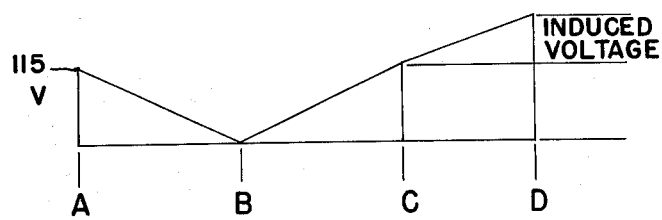
FIGURE 2 is a curve of voltages appearing between various points on the windings and ground of the induction motor of FIGURE 1.

Referring now more particularly to FIGURE 2, a curve of voltages is illustrated appearing between different points on the main and tap windings 12 and 14 and ground. It is seen that between point "A" on the main winding 12 and ground, a voltage difference exists which may be by way of example, 115 volts where 230 volts exists between power input terminals 16 and 20. Between the point "B" on main winding 12 and ground, the voltage is zero volts as seen from the curve of FIGURE 2. At point "C" which corresponds to the junction of main winding 12 and tap winding 14, the voltage once more is 115 volts with respect to ground as is clearly apparent from FIGURE 2. If the voltage is measured between point "D" and ground, the voltage may be as high as 185 volts due to the voltage which is induced in the tap winding by transformer action between the windings and which adds to the applied voltage. This transformer action is due to the fact that the main and tap windings are wound one upon the other with the tap winding usually being wound outside of the main winding. As will be more fully described hereinafter, the system of this invention eliminates this extra induced voltage so that the voltage at any point between either of the windings 12 and 14 and ground will never exceed 115 volts. This of course greatly reduces the likelihood of the windings shorting to ground.

Figure 4:
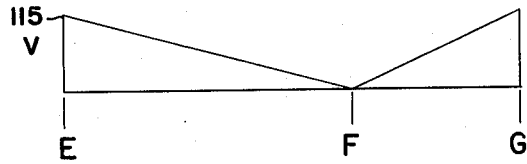
FIGURE 4 is a curve of voltages between the windings and ground of the motor of FIGURE 3.

Referring now to FIGURE 4, a curve of voltages between various points on the windings 12 and 14 and ground is plotted. At point "E," the voltage is once more 115 volts with respect to ground and drops to zero voltage with respect to ground at point "F." At point "G," the voltage with respect to ground is again 115 volts and it thus is seen that during low speed operation, the voltage appearing between any point on the main or tap windings and ground never exceeds 115 volts.

Figure 5:
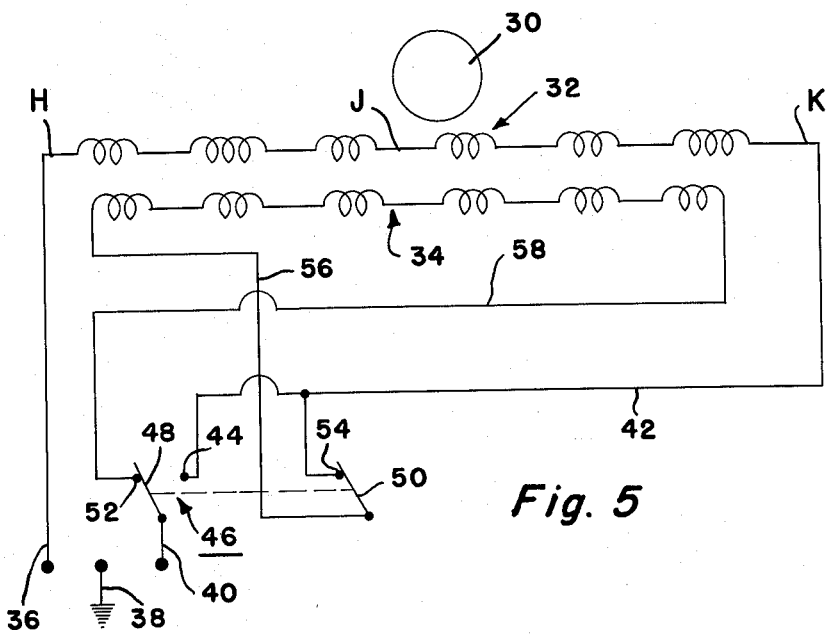
FIGURE 5 is a motor system made in accordance with this invention and illustrating the complete disconnection of the tap winding from the main winding and power source during high speed operation.

Referring now to FIGURE 5, a shaded pole induction motor made in accordance with this invention is illustrated which maintains the voltage between any point on the main or tap windings and ground at no higher than 115 volts. The shading coils of the motor are not illustrated and the conventional squirrel cage rotor is designated by reference numeral 30. The motor is a six pole motor having a main winding 32 consisting of six windings as is illustrated in FIGURE 5. The motor has another winding 34 which may be termed a tap winding and which consists of six coil windings. The main winding 32 and the tap winding 34 are wound on a common stator and the winding 34 may be wound over the winding 32 so that there is no angular displacement between the windings.

In FIGURE 5, the reference numerals 36, 38 and 40 are the three power input leads of a three wire A.C. system. The lead wire 38 is the neutral wire and with this arrangement, 230 volts will appear between lead wires 36 and 40 and 115 volts between either lead wire 36 and 40 and lead wire 38.

One side of the main winding 32 is connected directly to lead wire 36. The opposite side of main winding 32 is connected with a lead wire 42 and this lead wire is connected with fixed contacts 44 and 54 of a manually operable switch which is generally designated by reference numeral 46. The switch 46 includes movable contactors 48 and 50 which are ganged together. In addition to the fixed contacts 44 and 54, this switch has a fixed contact 52. It is seen that one side of the tap winding 34 is connected with the movable contactor 50 via lead wire 56. The opposite side of tap winding 34 is connected with the fixed contact 52 via the lead wire 58. The movable contactor 48 is connected with the power input lead 40 as is clearly apparent from FIGURE 5.

With the contactors 48 and 50 in the position illustrated in FIGURE 5, the motor 30 will operate at its low speed since the main winding 32 and the tap winding 34 are connected in series and across lead wires 36 and 40. This circuit can be traced from lead wire 36, through main winding 32, through lead wire 42, through contactor 50, through lead wire 56, through tap winding 34, through lead wire 58, and then through contactor 48 to the power lead 40.

If the contactors 48 and 50 are shifted rightwardly in FIGURE 5, the contactor 48 will engage the fixed contact 44 and the contactor 50 will be shifted out of engagement with the fixed contact 54. The motor will now operate at high speed since only the main winding 32 is connected across the power source. This circuit can be traced from lead wire 36, through the main winding 32, through lead wire 42, and then through the movable contactor 48 to the power lead 40. It is important to note that when the contactors 48 and 50 are shifted rightwardly in FIGURE 5, the tap winding 34 is completely disconnected or isolated from both the main winding 32 and from the power leads.

Figure 6:
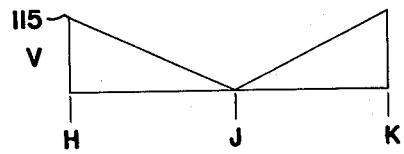
FIGURE 6 is a curve of voltages appearing between the windings and ground in the system of FIGURE 5 during high speed operation.

When the motor is connected for high speed operation that is when the contactor 48 engages contactor 44 and the contactor 50 leaves contact 54, the voltage conditions between points on the main winding 32 and ground will be as depicted in FIGURE 6. Thus between point "H" on the main winding 32 and ground, the voltage will be approximately 115 volts. Between point "J" and ground, the voltage will be zero volts and between point "K" and ground, the voltage will be 115 volts. Since the tap winding is completely disconnected or isolated from both the main winding 32 and the power leads, there is no substantial induced voltage which will appear between the tap winding and ground or between the main winding 32 and ground and this voltage which thus may cause a short is greatly reduced as compared to the circuit illustrated in FIGURE 1. This is readily seen from a comparison of FIGURES 2 and 6.

When the contactors 48 and 50 are in the positions illustrated in FIGURE 5, the voltage relationship between certain points on the main winding and tap winding and ground is the same as that depicted in FIGURE 4.

Figure 7:
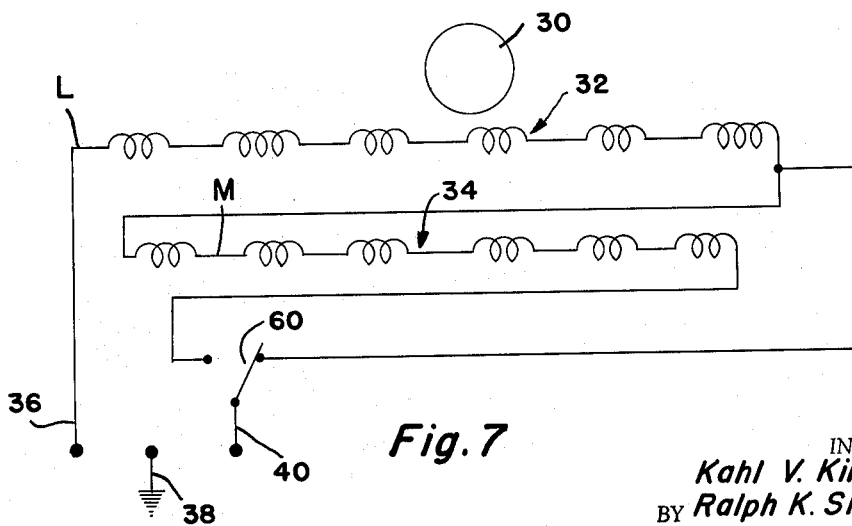
FIGURE 7 is a schematic illustration of a motor connected as shown in FIGURE 1 with windings of the type illustrated in FIGURE 5.

It can be seen from the foregoing that the system of FIGURE 5 greatly reduces the amount of voltage appearing between the tap winding 34 and ground as compared to the system of FIGURE 1 when the motor is in its high speed mode of operation. The system of FIGURE 5 also reduces the likelihood of shorting between the main winding 32 and the tap winding 34. In order to better understand this, a system is illustrated in FIGURE 7 which is connected the same as FIGURE 1 but which discloses the six pole motor circuit of FIGURE 5. In FIGURE 7, the switch 60 controls the connection of the main winding 32 and the tap winding 34. In the FIGURE 7 position, of the switch 60, the motor is connected for high speed operation in a manner similar to that illustrated in FIGURE 1. Thus in FIGURE 7, the tap winding 34 is not completely disconnected or isolated from the main winding 32 or the power lead 40. This causes considerable differences in potentials between various points on the main winding 32 and on the tap winding 34 which do not exist with the FIGURE 5 system. As an example, where the power leads 36 and 40 are connected with 240 volts, the potential between points "L" and "M" in the circuit of FIGURE 7 may be for example 250 volts. This potential which is given by way of example, will equal the sum of the applied voltage and the voltage which is induced in the tap winding 34 by transformer action. Various other points between the main winding 32 and tap winding 34 will show other differences in potential which can cause a shorting between the two windings. It can be seen however with the system of FIGURE 5, the tap winding 34 is completely disconnected and isolated from both the main winding 32 and from the power lead 40 so that there is no substantial difference in potential between the main winding 32 and 34 to cause shorting.

It is pointed out that the system of FIGURE 5 could be used with a permanent split phase capacitor start motor as well as a shaded pole motor.

In the above description, reference has been made to specific voltage values. These examples are given by way of illustration and not by way of limitation. In this connection, the curves of FIGURES 2, 4 and 6 would be different where the motor is energized with 115 volts rather than 230 volts but the advantages of this invention would be the same and could be depicted by similar curves.

While the embodiments of the present invention as herein disclosed, constitute a preferred form, it is to be understood that other forms might be adopted.

What is claimed is as follows:

1. An electric motor system comprising, a rotor, a stator having first and second windings, means for electrically connecting said first and second windings in series and across a source of power, and means for connecting only said first winding across said source of power, said last-named means completely disconnecting said second winding from said first winding and from said power source.

2. In combination, a shaded pole motor having a rotor and a stator including first and second windings, and switch means operable to a first position for electrically connecting said windings in series with each other and across a source of power, said switch means in another position connecting only said first winding across said source of power and completely disconnecting said second winding from said source of power and from said first winding.

3. In combination, an electric motor having a rotor and a stator including first and second windings, a source of A.C. power, and switch means, said switch means in one position connecting said first and second windings in series with each other and across said source of power, said switch means in another position completely disconnecting said second winding from said power source and from said first winding and connecting said first winding across said power source.

4. In combination, an electric motor having a rotor and a stator, said stator having first and second windings, said first winding having first and second end conductors and said second winding having third and fourth end conductors, a source of electrical power, a switching means, means connecting said first end conductor of said first winding with one side of said power source, said switching means in one position electrically connecting said third end conductor of said second winding with an opposite side of said power source and electrically connecting the second end conductor of said first winding with the fourth end conductor of said second winding, said switching means in another position connecting said second end conductor of said first winding with said opposite side of said power source and completely disconnecting the third and fourth end conductors of said second winding from said power source and the first and second end conductors of said first winding.

References Cited by the Examiner

UNITED STATES PATENTS 2,900,588  8/59  Ramer _____ 318—225

JOHN F. COUCH, *Primary Examiner.*

ORIS L. RADER, *Examiner.*